Aug. 23, 1932.  W. E. CLARK  1,873,289
ARTIFICIAL BAIT
Filed April 14, 1931

Inventor
William E. Clark

By Clarence A. O'Brien
Attorney

Patented Aug. 23, 1932

1,873,289

UNITED STATES PATENT OFFICE

WILLIAM ERSKINE CLARK, OF LA PORTE, INDIANA

ARTIFICIAL BAIT

Application filed April 14, 1931. Serial No. 530,068.

This invention relates to an artificial bait for use in fishing and has for one of its important objects to provide, in a manner as hereinafter set forth, a device of this character embodying a novel construction and arrangement of parts whereby fouling of the bait when in use will be practically eliminated.

Another important object of the invention is to provide an artificial bait of the character described embodying a construction whereby the same will float when stationary in the water but which will travel approximately a foot beneath the surface of the water when drawn therethrough.

Other objects of the invention are to provide an artificial bait of the character described which will be simple in construction, strong, durable, efficient and reliable in use, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
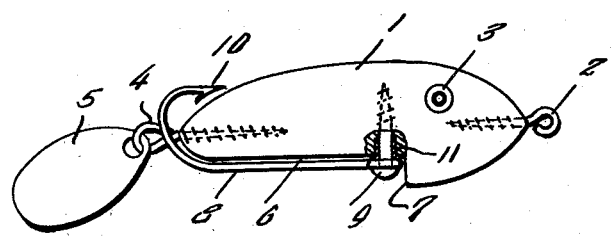
Figure 1 is a view principally in side elevation of an artificial bait constructed in accordance with this invention.

Referring now to the drawing in detail, it will be seen that the reference numeral 1 designates the body of the artificial bait, said body being formed of any suitable material, preferably wood, and being substantially ovate in plan. Anchored in the forward end or nose of the body 1 is an eye screw 2 for connecting the artificial bait to the fishing line (not shown). Representations of eyes in the body 1 adjacent the forward end thereof are designated by the reference numeral 3. The body 1 may, of course, be attractively ornamented.

An eye screw 4 is anchored in the rear or tail end of the body 1 and constitutes means for securing a spoon 5 thereto. The spoon 5 may be of any desired form and size.

Figure 2:
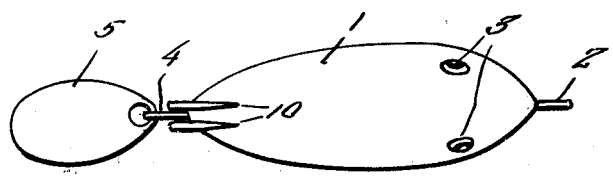
Figure 2 is a view in top plan thereof.
Figure 3:
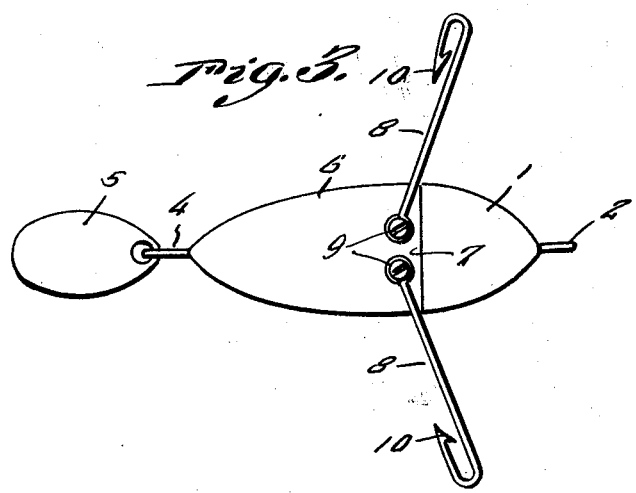
Figure 3 is a view in bottom plan of the artificial bait.

On its lower side the body 1 is cut away as at 6 to provide a transverse shoulder 7 at a point forwardly of the intermediate point in the body 1. The cut away portion 6 forms a flat lower surface on the body 1 which extends from the shoulder 7 to the rear end thereof and mounted for swinging movement beneath this flat surface are the hooks 8 which are pivotally secured to the body 1 adjacent the shoulder 7 by the screws 9. The hooks 8 are adapted to be disposed adjacent opposite sides of the eye screw 4. The hooks are directed upwardly from the shank portions and the barbs 10 of said hooks are disposed adjacent the upper rear portion of the body 1 in a manner to be shielded by said body 1 when the hooks are disposed adjacent opposite sides of the eye screw 4, as seen in Figures 1 and 2 of the drawing. The hooks are adapted to be swung outwardly relative to the body 1 to the position illustrated in Figure 3 of the drawing.

When in use, the shoulder 7 shields the forward ends of the hooks 8 from weeds and other foreign matter or obstructions which may be encountered when the artificial bait is being drawn through the water and, as before stated, the construction and arrangement of the barbs 10 relative to the body 1 of the artificial bait are such that said body 1 will shield the barbs from weeds, obstructions and other foreign matter. It will thus be seen that an artificial bait has been provided which will be practically free from fouling when in use.

Ferrules 11 are provided on the screws 9 for spacing the hooks from the body and for preventing binding of said hooks. The eye portions of the hooks through which the screws 9 pass are engaged with the ferrules 11, as seen in Figure 1 of the drawing.

It is believed that the many advantages of an artificial bait constructed in accordance with the present invention will be readily understood, and although the preferred embodiment of the invention is as illustrated and described, it is to be understood that changes in the details of construction may be had which will fall within the scope of the invention as claimed.

What is claimed is:—

In an artificial bait structure, a body having a bottom and a top, the top being curved downward towards the rear end thereof to define a tail, and a pair of hooks pivoted to said bottom and having a bill to overhang the downwardly curved portion of the top which forms said tail, said bill being below the level of the highest point of said back, and a spoon having an attaching member arranged between said hooks to maintain the same in spaced relation, said hooks being movable out to position at angles to the longitudinal axis of said body.

In testimony whereof I affix my signature.

WILLIAM ERSKINE CLARK.